US006668614B2

(12) United States Patent
Itakura

(10) Patent No.: US 6,668,614 B2
(45) Date of Patent: Dec. 30, 2003

(54) CAPACITIVE TYPE PHYSICAL QUANTITY DETECTING SENSOR FOR DETECTING PHYSICAL QUANTITY ALONG PLURAL AXES

(75) Inventor: Toshikazu Itakura, Toyota (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/234,142

(22) Filed: Sep. 5, 2002

(65) Prior Publication Data

US 2003/0070484 A1 Apr. 17, 2003

(30) Foreign Application Priority Data

Oct. 16, 2001 (JP) ......................................... 2001-318467

(51) Int. Cl.[7] ........................ G01P 21/00; G01P 15/125; G01R 27/26
(52) U.S. Cl. ...................... 73/1.38; 73/514.32; 324/661
(58) Field of Search ............................. 73/1.38, 514.32, 73/514.16, 862.626; 324/162, 661, 672, 679; 361/280, 283.1, 283.3

(56) References Cited

U.S. PATENT DOCUMENTS

| 5,492,020 | A | | 2/1996 | Okada |
| 5,497,668 | A | | 3/1996 | Okada |
| 6,257,061 | B1 | | 7/2001 | Nonoyama et al. |
| 6,450,029 | B1 | * | 9/2002 | Sakai et al. .................... 73/488 |
| 6,483,322 | B2 | * | 11/2002 | Aoyama et al. ............ 324/661 |

* cited by examiner

Primary Examiner—Richard A. Moller
(74) Attorney, Agent, or Firm—Posz & Bethards, PLC

(57) ABSTRACT

A control signal generator transmits a first signal to a movable electrode and a fixed electrode to detect a change in a capacitance formed between the movable electrode and the fixed electrode during a normal physical quantity detection timing interval. Also, the control signal generator transmits a second signal to the movable electrode and the fixed electrode instead of the first signal to move the movable electrode for diagnosing a malfunction of each of a plurality of physical quantity detection portions during a self diagnosis timing interval. The control signal generator transmits the second signal to the movable electrode and the fixed electrode of each physical quantity detection portion during a different timing intervals.

7 Claims, 6 Drawing Sheets

CAPACITIVE TYPE PHYSICAL QUANTITY DETECTING SENSOR FOR DETECTING PHYSICAL QUANTITY ALONG PLURAL AXES

CROSS REFERENCE TO RELATED APPLICATION

This application is based upon and claims the benefit of Japanese Patent Application No. 2001-318467 filed on Oct. 16, 2001, the contents of which are incorporated herein by reference.

FIELD OF THE INVENTION

The present invention relates generally to sensors, and specifically to a capacitive type physical quantity detecting sensor for detecting physical quantities along plural axes.

DESCRIPTION OF THE RELATED

JP-A-2000-81449 (USP 6,257,061) discloses a capacitive type physical quantity detecting sensor with a malfunction self diagnosis function. The capacitive type physical quantity detecting sensor diagnoses malfunctions itself by using the resonance of the sensor elements generated based on the frequency (hereinafter referred to as self diagnosis frequency) of an applied electrical voltage.

However, if the above mentioned technology is applied to a capacitive type physical quantity detecting sensor for detecting physical quantities along two directional axes, since the self diagnosis frequency is used to create resonance of the sensor elements, another resonance is simultaneously generated between both sensor elements. That is, the sensor elements interfere with each other during self diagnosis so that a resonance, which is different from the resonance being used for the diagnosis, is generated. Accordingly, an accurate sensor output that is expected during self diagnosis cannot be obtained.

SUMMARY OF THE INVENTION

It is therefore an object of the present invention to provide a capacitive type physical quantity detecting sensor that is capable of obviating the above problems.

It is another object of the present invention to provide a capacitive type physical quantity detecting sensor that is capable of diagnosing malfunctions along plural axes.

In the capacitive type physical quantity detecting sensor of the present invention, during a normal physical quantity detection timing interval, a control signal generator transmits a first signal to a movable electrode and a fixed electrode to detect a change in capacitance between the movable electrode and the fixed electrode. During a self diagnosis timing interval, the control signal generator also transmits a second signal to the movable electrode and the fixed electrode to move the movable electrode for diagnosing a malfunction of each physical quantity detection portion. The control signal generator transmits the second signal to the movable electrode and the fixed electrode of each physical quantity detection portion during different timing intervals.

According to the capacitive type physical quantity detecting sensor of the present invention, the resonance of sensor elements of one of the plurality of physical quantity detection portions does not affect that of the sensor elements of the others of the plurality of physical quantity detection portions. Therefore, sensor output error decreases. As a result, it is possible to diagnose sensor malfunction accurately along each axis of the multi-axis capacitive type physical quantity detecting sensor.

In a capacitive type physical quantity detecting sensor of the present invention, a first frequency of a second signal transmitted to a first one of the plurality of quantity detection portions is different from a second frequency of the second signal transmitted to a second one of the plurality of the physical quantity detection portions.

As a result, it is possible to diagnose sensor malfunction accurately along each axis of the multi-axis capacitive type physical quantity detecting sensor.

BRIEF DESCRIPTION OF THE DRAWINGS

Other objects, features and advantages of the present invention will be understood more fully from the following detailed description made with reference to the accompanying drawings in which.

DETAILED DESCRIPTION OF THE PREFERRED EMBODIMENTS

Figure 1:
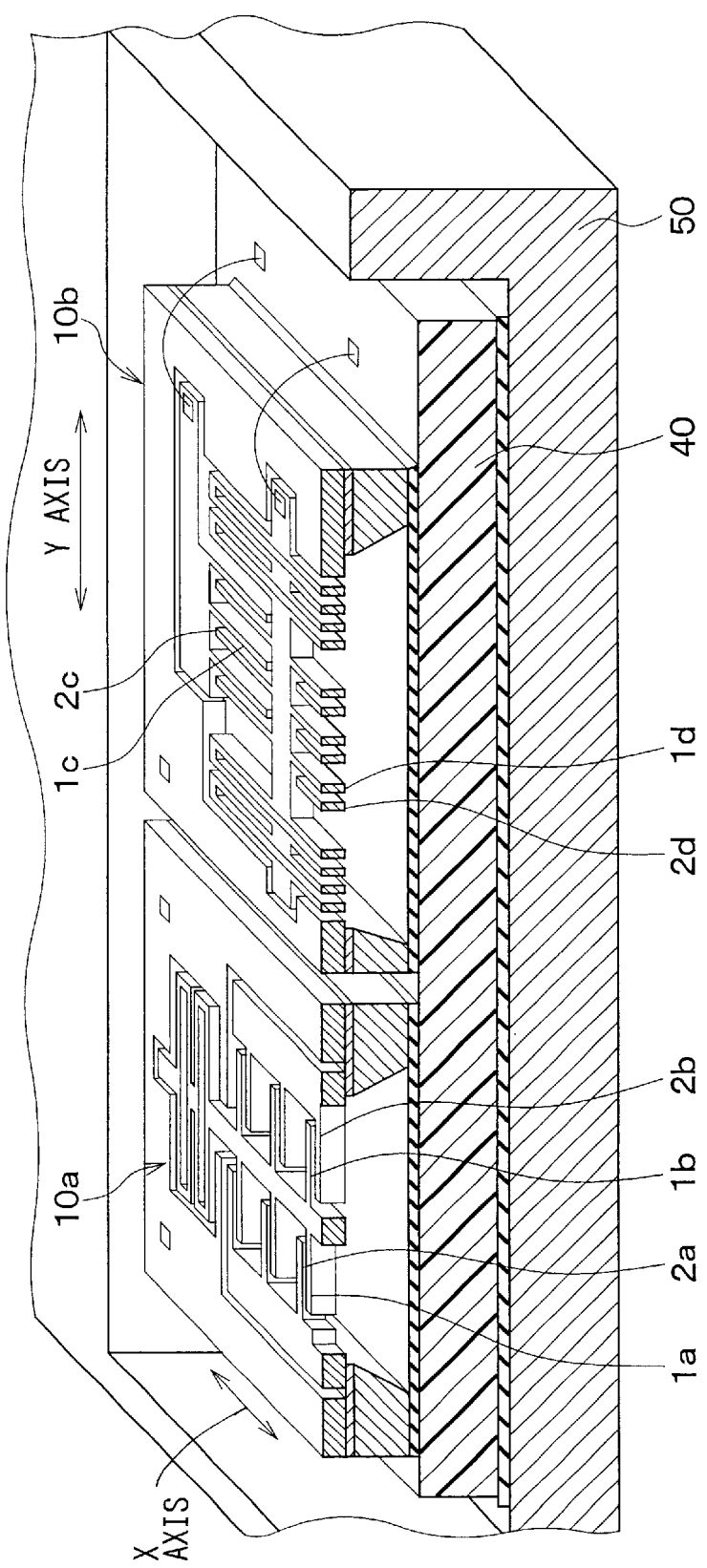
FIG. 1 shows an oblique perspective cross sectional view of an acceleration sensor according to a first embodiment of the present invention.

The present invention will be described further with reference to various embodiments shown in the drawings.

(First embodiment)

A capacitive type acceleration sensor is described as a capacitive type physical quantity detecting sensor. Referring to FIG. 1, the acceleration sensor includes a first detection portion for detecting acceleration along the X axis and a second detection portion for detecting acceleration along the Y axis. The acceleration sensor is accommodated in a vehicle so that the X axis corresponds to a font/rear direction of the vehicle and the Y axis corresponds to a left/right direction.

Figure 2:
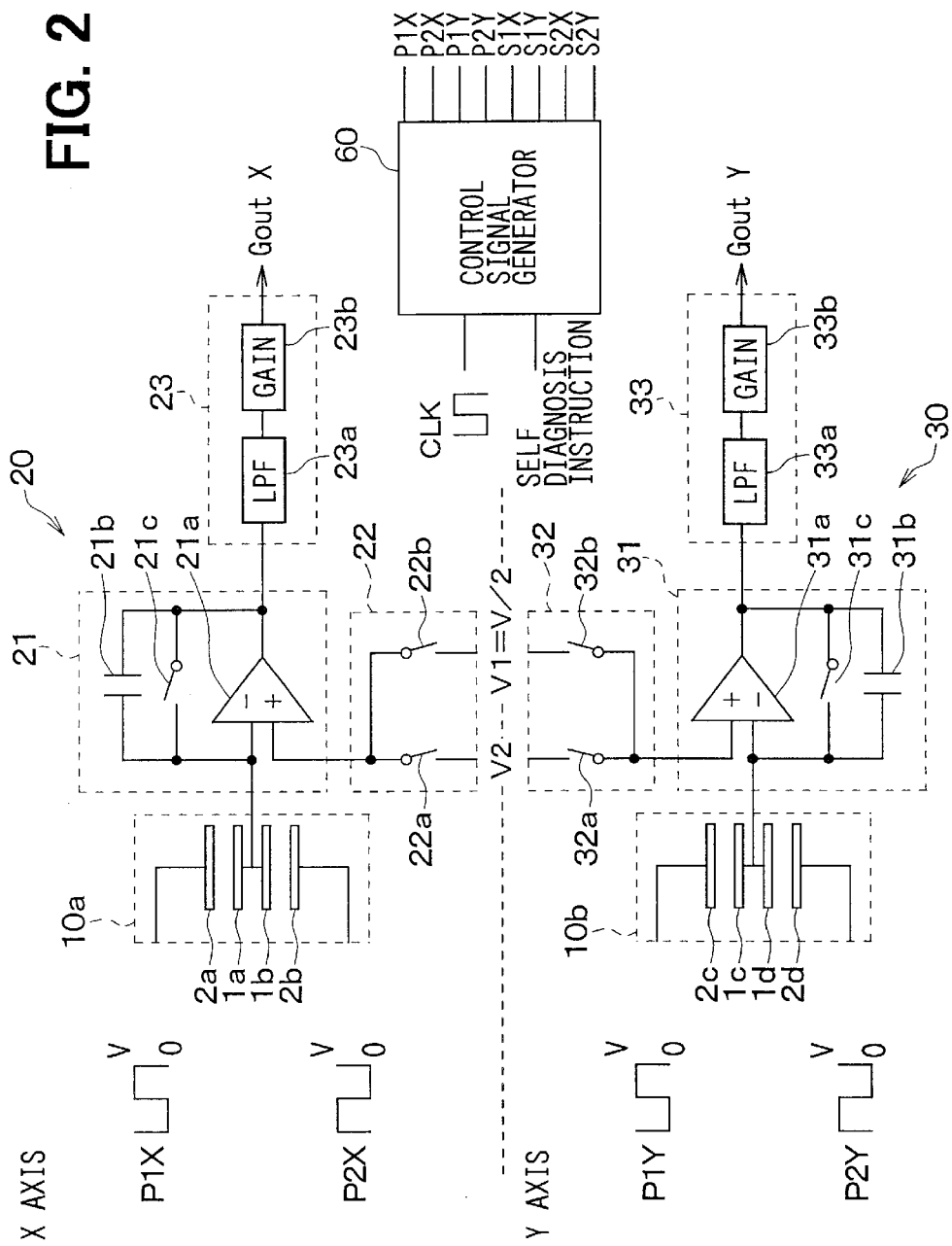
FIG. 2 shows an electrical circuit of the acceleration sensor according to the first embodiment.

Referring to FIG. 2, the first detection portion includes a sensor element 10a and an acceleration detection circuit 20. The sensor element 10a includes movable electrodes 1a and 1b and fixed electrodes 2a and 2b. The acceleration detection circuit 20 detects acceleration along the X axis based on a change in a differential capacitance formed between each of movable electrodes 1a and 1b and the fixed electrodes 2a and 2b.

The second detection portion includes a sensor element 10b and an acceleration detection circuit 30. The sensor element 10b includes movable electrodes 1c and 1d and fixed electrodes 2c and 2d. The acceleration detection circuit 30 detects acceleration along the Y axis based on a change in a differential capacitance formed between each of the movable electrodes 1c and 1d and the fixed electrodes 2c and 2d.

As shown in FIG. 1, the sensor elements 10a, 10b are respectively formed by different semiconductor chips. The acceleration detection circuits 20, 30 are formed on an electrical circuit chip 40 on which the chips including the sensor elements 10a, 10b are disposed. The sensor elements 10a, 10b and the electrical circuit chip 40 are accommodated in a package 50.

The sensor elements 10a, 10b are beams formed from the semiconductor substrate by which the movable electrodes 1a–1d and the fixed electrodes 2a–2d are formed. The movable electrodes 1a–1d and the fixed electrodes 2a–2d are arranged to face each other so as to a form differential capacitance therebetween. Inverted voltages are applied to the fixed electrodes 2a, 2c and the fixed electrodes 2b, 2d. Therefore, the change of differential capacitance caused by movement of the movable electrodes 1a–1d enables the acceleration along both the X and Y axes to be detected.

Also, as shown in FIG. 2, the acceleration detection circuits 20, 30 include C-V converters 21 and 31, switch circuits 22 and 32, signal processing circuits 23 and 33, and a control signal generator 60.

The C-V converters 21, 31 convert the differential capacitances formed by the movable electrodes 1a–1d and fixed electrodes 2a–2d to voltages. The C-V converters 21, 31 include operational amplifiers 21a and 31a, capacitors 21b and 31b and switches 21c and 31c. Inverting input terminals of the operational amplifiers 21a, 31a connect to the movable electrodes 1a–1d. The capacitors 21b, 31b and the switches 21c, 31c are connected between the inverting input terminals and output terminals of the operational amplifiers 21a, 31a. The switch 21c is driven based on a signal S1X from the control signal generator 60, and the switch 31c is driven based on a signal S1Y from the control signal generator 60. A predetermined voltage is applied to non-inverting input terminals of the operational amplifiers 21a, 31a via the switch circuits 22, 32. The predetermined voltage corresponds to a half voltage applied to the fixed electrodes 2a–2d (i.e., an intermediate voltage, for example, 2.5V) and a voltage different from the half voltage (e.g., 4V).

The switch circuits 22, 32 supply a voltage from a voltage resource (not shown) to the non-inverting input terminals of the operational amplifiers 21a, 31a. The switch circuits 22, 32 include switches 22a, 32a and switches 22b, 32b. The switches 22a, 32a are driven based on a signal S2X from the control signal generator 60, and the switches 22b, 32b are driven based on a signal S2Y from the control signal generator 60. Therefore, the switches 22a, 32a are driven to a status opposite that of the switches 22b, 32b. That is, when a pair of the switches 22a, 32a and 22b, 32b is closed, the other pair of switches 22a, 32a and 22b, 32b is opened.

The signal processing circuits 23, 33 include Low Pass Filter (LPF) circuits 23a, 33a and gain circuits 23b, 33b. The LPF circuits 23a, 33a remove a high frequency component from an output of the C-V converters 21, 31 so that only a component within a predetermined frequency range is output. The gain circuits 23b, 33b amplify output signals through the LPF circuits 23a, 33a to output the signals as acceleration signals Gout X and Gout Y.

The control signal generator 60 outputs signals (carrier waves) P1X, P2X, P1Y and P2Y corresponding to voltage application timing intervals for applying voltages to the fixed electrodes 2a–2d, signals S2X and S2Y corresponding to switching timing intervals of the switch circuits 22, 32, and signals S1X and S1Y corresponding to switching timing intervals of the switch circuits 21c, 31c. The control signal generator 60 outputs the respective signals based on a clock signal CLK. The respective signals generated by the control signal generator 60 are different during normal acceleration detection from the signals generated during outputs signals for detecting acceleration when a self diagnosis instruction signal is low and outputs signals for executing self diagnosis when the self diagnosis instruction signal is high.

Figure 3:
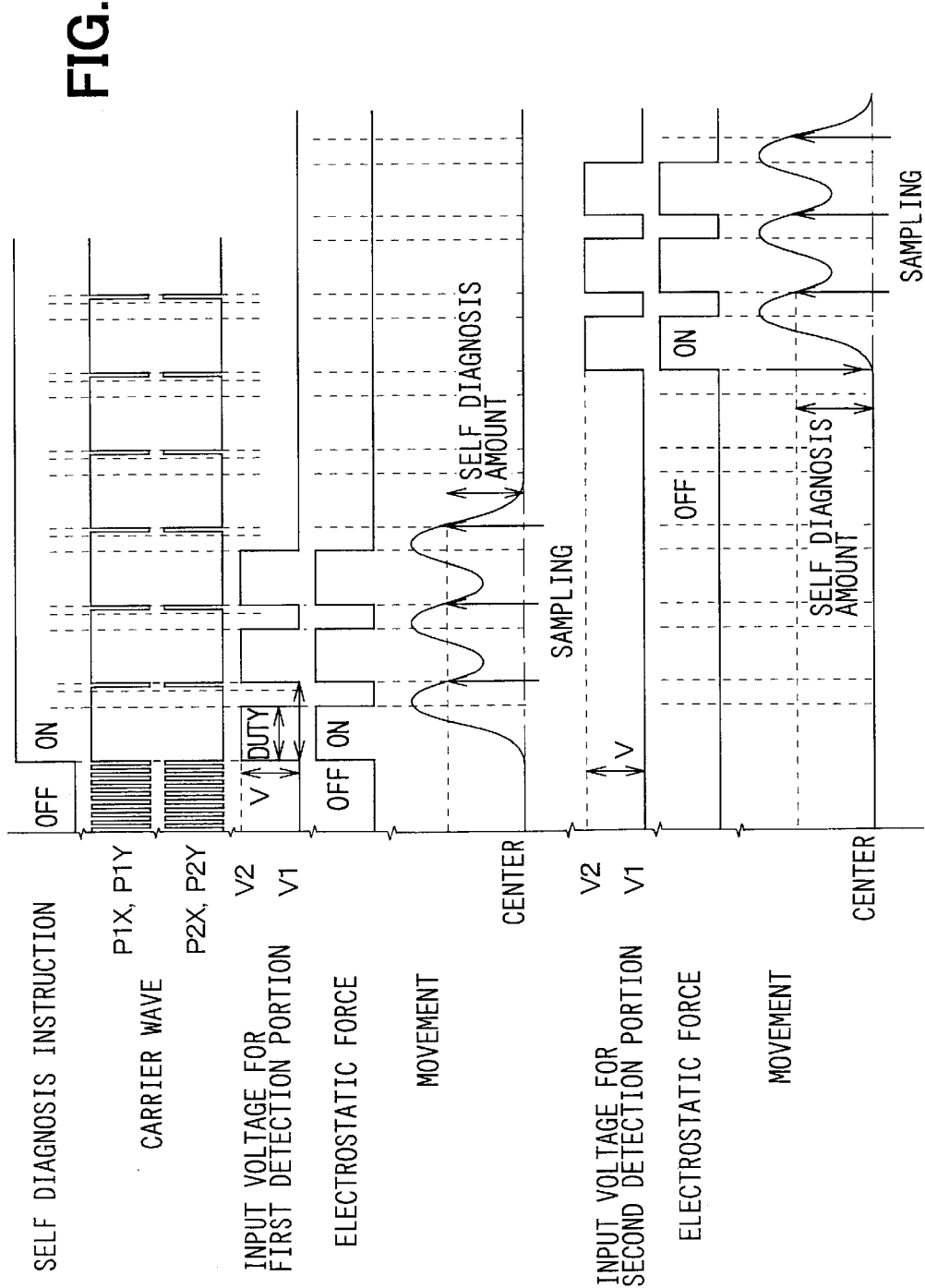
FIG. 3 shows a time chart of respective signals, input voltages, electrostatic forces and movements of the movable electrodes when the acceleration sensor is operative according to the first embodiment.
Figure 4:
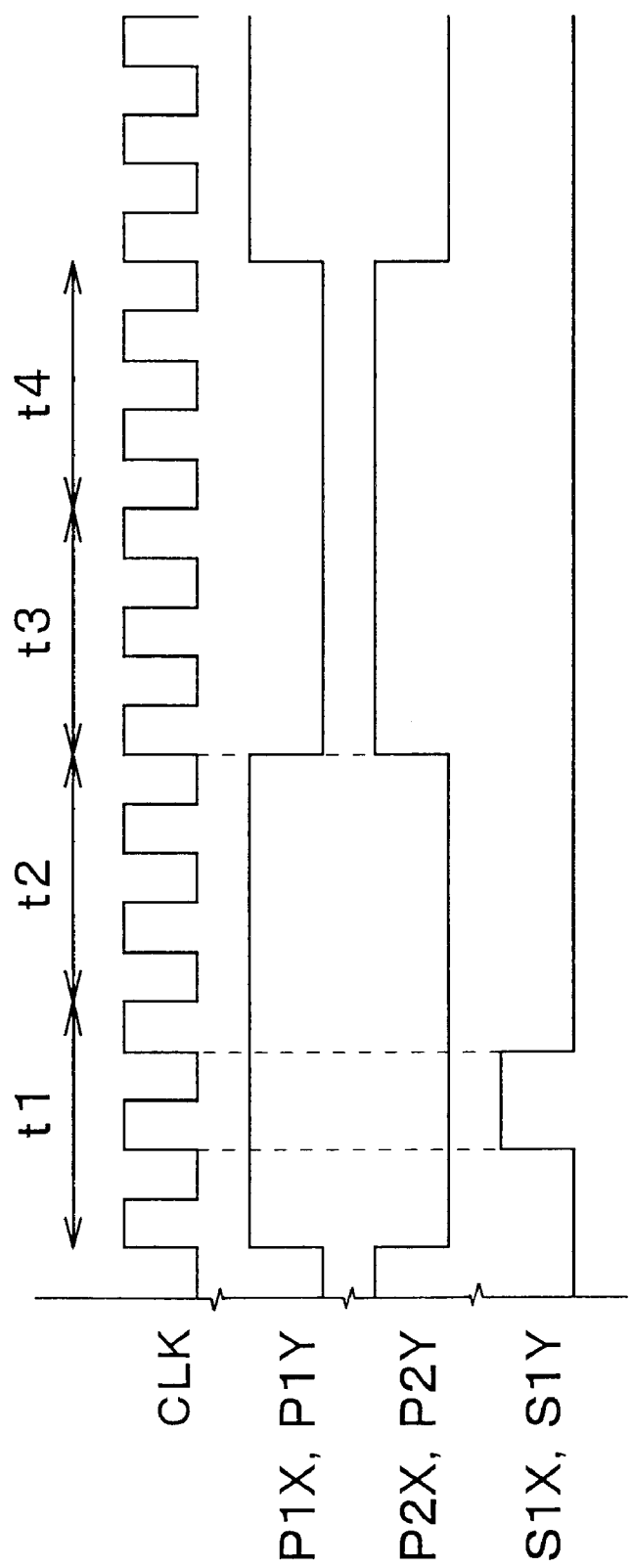
FIG. 4 shows a detailed timing chart of clock signal CLK, output signals P1X, P2X, P1Y and P2Y and signals S2X, S2Y during normal acceleration detection according to the first embodiment.

Referring to FIGS. 3 and 4, which show timing charts of the acceleration sensor of the present invention, operation during acceleration detection and during self diagnosis by the acceleration sensor will now be discussed. FIG. 3 shows wave patterns of carrier waves, input voltage for the first and second detection portions, electrostatic forces generated between the movable electrodes 1a–1d and the fixed electrodes 2a–2d, and movements of the movable electrodes 1a–1d when the acceleration sensor stops normal acceleration detection and then starts the self diagnosis. FIG. 4 shows details of signals during acceleration detection.

As shown in FIG. 3, during normal acceleration detection, acceleration detection is executed because the self diagnosis instruction signal is low. In this condition, operation of the acceleration detection is described with reference to FIG. 4. Incidentally, during normal acceleration detection, the switches 22a, 32a are opened and the switches 22b, 32b are closed based on the signals S2X, S2Y, but these timing charts are not shown in FIG. 4. Therefore, an intermediate voltage V1 (i.e., 2.5V in the present embodiment) is applied to the non-inverting input terminals of the operational amplifiers 21a, 31a and is therefore applied to the movable electrodes 1a–1d.

The signals P1X, P1Y are voltage signals having a predetermined amplitude V (i.e., 5V in the present embodiment) and are inverted with respect to the signals P2X, P2Y. The signals P1X, P1Y, P2X and P2Y are predetermined amplitude rectangular waves whose signal levels change between high and low as shown during timing intervals t1–t4.

At the first timing interval t1, electric potentials of the fixed electrodes 2a, 2c have a value of v and electric potentials of the fixed electrodes 2b, 2d have a value of zero based on the signals P1X, P2X, P1Y and P2Y respectively. Also, the switches 21c, 31c are closed based on the signals S1X, S1Y from the control signal generator 60. Therefore, the movable electrodes 1a-1d are biased to an electric potential of V/2 due to operation of the operational amplifiers 21a, 31a. The capacitors 21b, 31b acting as feedback capacitors discharge charges therein.

In this condition, if capacitances C1 formed between movable electrodes 1a, 1c and fixed electrodes 2a, 2c are larger than capacitances C2 formed between movable electrodes 1b, 1d and fixed electrodes 2b, 2d (C1>C2), a large number of negative charges exist in the movable electrodes 1a–1d because the electric potentials of the fixed electrodes 2a–2d are the above mentioned values.

At the second timing interval t2, electric potentials of the fixed electrodes 2a, 2c are maintained at V and electric potentials of the fixed electrodes 2b, 2d are maintained at zero based on the signals P1X, P2X, P1Y and P2Y respectively. However, the switches 21c, 31c are opened based on the signals S1X, S1Y from the control signal generator 60. Therefore, the capacitors 21b, 31b are charged based on the condition of the movable electrodes 1a–1d. Voltages values according to the charged capacitors 21b, 31b are output by the C-V converters 21, 31 and pass through the LPF circuits 23a, 33a and the gain circuits 23b, 33b. The outputs Gout X and Gout Y from the gain circuits 23b, 33b are then sampled.

In the third timing interval t3, electric potentials of the fixed electrodes 2a, 2c are changed to zero and electric potentials of the fixed electrodes 2b, 2d are also changed to V based on the signals P1X, P2X, P1Y and P2Y respectively. The switches 21c, 31c are maintained open based on the signals S1X, S1Y from the control signal generator 60.

In this condition, charges in the movable electrodes 1a–1d are opposite in polarity status in the second timing interval t2 because the signals P1X, P2X, P1Y and P2Y are inverted. That is, if capacitances C1 formed between movable electrodes 1a, 1c and fixed electrodes 2a, 2c are larger than capacitances C2 formed between movable electrodes 1b, 1d and fixed electrodes 2b, 2d (C1>C2), there are a large number of positive charges in the movable electrodes 1a–1d because the electric potentials of the fixed electrodes 2a–2d are at above mentioned values.

However, the charges in the first timing interval t1 are still maintained in the movable electrodes 1a–1d because the movable electrodes 1a–1d and capacitors 21b, 31b respectively form closed circuits. Therefore, excessive charges move to and are charged in the capacitors 21b, 31b. Accordingly, per the formula Q=CV, voltage values that are proportional to charges (Q) moved from the movable electrodes 1a–1d and inversely proportional to capacitance values (C) of the capacitors 21b, 31b are output by the C-V converters 21, 31.

In the fourth timing interval t4, electric potentials of the fixed electrodes 2a, 2c are maintained at zero and electric potentials of the fixed electrodes 2b, 2d are also maintained at V based on the signals P1X, P2X, P1Y and P2Y respectively. After outputs of the C-V converters 21, 31 are sufficiently stabilized, the gain circuit 23b, 33b amplify the output signals through the LPF circuits 23a, 33a to produce as acceleration signals Gout X and Gout Y.

At last, a differential voltage between the outputs Gout X sampled in the second timing interval t2 and sampled in the fourth timing interval t4 is calculated. Further, a differential voltage between the outputs Gout Y sampled during the second timing interval t2 and sampled during the fourth timing interval t4 is calculated. As a result, acceleration along each of the X and Y axes according to movement of the movable electrodes 1a–1d is detected based on the differential voltages.

Next, as shown in FIG. 3, the self diagnosis operation is executed because the self diagnosis instruction signal is high. In this condition, control signals for executing self diagnosis are output by the control signal generator 60. With the control signals, self diagnosis for the first detection portion and that for the second detection portion are executed in this order.

In the self diagnosis for the first detection portion, a voltage difference is generated between the fixed electrodes 2a, 2c and the fixed electrodes 2b, 2d based on the signals P1X, P2X, 22a of the switch circuit 22 is closed and the switch 22b thereof is opened based on the signal S2X. Therefore, a voltage V2 (i.e., 4V in the present embodiment), which is different from the intermediate voltage V1 corresponding to an electrical potential between the fixed electrodes 2a, 2b, is applied to the non-inverting input terminal of the operational amplifier 21a to execute the self diagnosis.

Accordingly, a voltage difference between the movable electrode 1b and the fixed electrode 2b (=4V) is larger than that between the movable electrode 1a and the fixed electrode 2a (=1V), and therefore an electrostatic force between the movable electrode 1b and the fixed electrode 2b increases. As a result, the movable electrodes 1a, 1b are forced to move from a center position between the fixed electrodes 2a, 2b.

Figure 5:
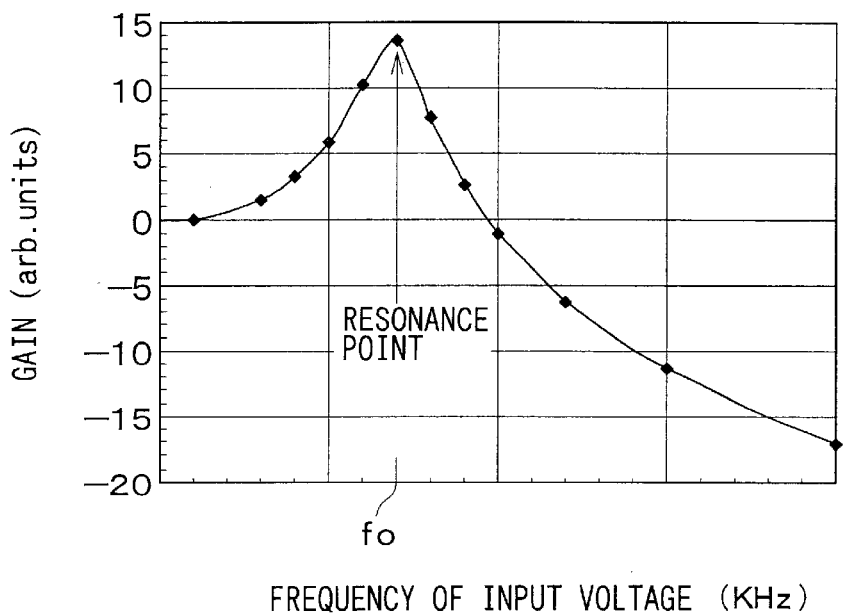
FIG. 5 shows resonance frequency features with respect to the frequency of an input voltage for a movable electrode according to the first embodiment.

In the self diagnosis, timing of generation of the electrostatic force is controlled based on a period of the signal S2X for driving the switch circuit 22 to make the movable electrodes 1a, 1b move sufficiently so that their movements can be detected. For example, a relationship between a frequency of an input voltage to a resonance frequency of the movable electrodes 1a, 1b is shown in FIG. 5.

Figure 6:
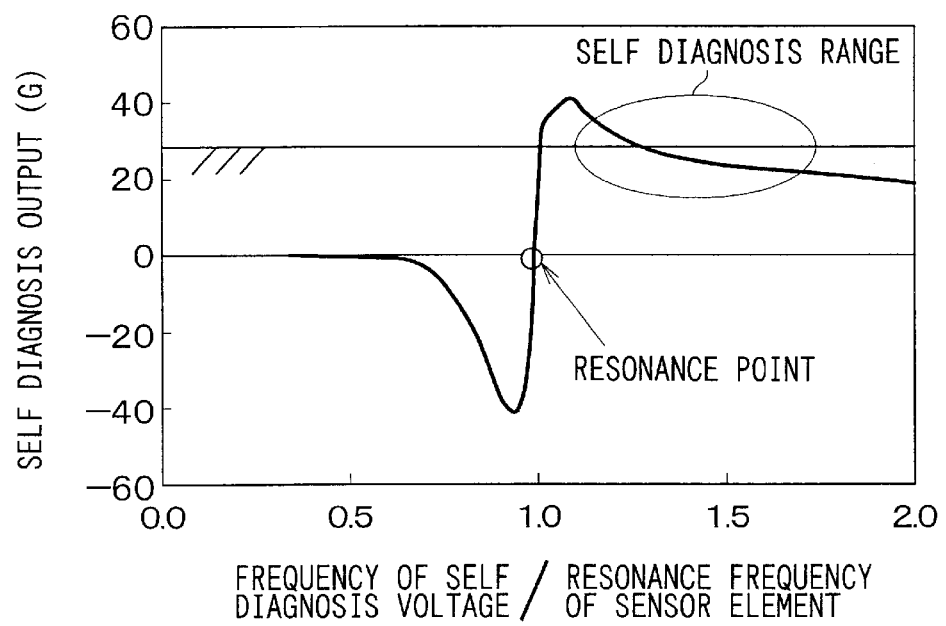
FIG. 6 shows a relationship between resonance (frequency of self diagnosis voltage/resonance frequency of sensor element) and a self diagnosis output according to the first embodiment.

Also, a relationship between resonance and output during self diagnosis is shown in FIG. 6. As shown in FIG. 6, when the relationship between the frequency of input voltage during self diagnosis and the resonance frequency of the sensor element is close to the resonance point, the output during self diagnosis obtained is used as a self diagnosis range.

The switch 22 is continuously changed based on the signal S2X, and the intermediate voltage V1 corresponding a voltage between voltage potentials of both fixed electrodes 2a, 2b is applied to the non-inverting input terminal of the operational amplifier 21a as in the acceleration detection.

The first detection portion is then operated as the normal acceleration detection position mentioned above, and therefore an output Gout X corresponding to the movements of the movable electrodes 1a, 1b is obtained. In this manner, since the movements of the movable electrodes 1a, 1b caused by the electrostatic force are defined based on the voltage value applied to the non-inverting input terminal of the operational amplifier 21a, an output corresponding to the movements of the movable electrodes 1a, 1b is also defined. Therefore, self diagnosis is executed by comparing an obtained output Gout X to a predetermined output (self diagnosis value) defined based on the voltage value applied to the non-inverting input terminal of the operational amplifier 21a.

Regarding the second detection portion, during self diagnosis of the first detection portion, the switch 32a of the switch circuit 32 is opened and the switch 32b thereof is closed based on the signal S2Y. Therefore, the intermediate voltage V1 is applied to the non-inverting input terminal of the operational amplifier 31a as during acceleration detection. Accordingly, self diagnosis is not executed.

When a predetermined time passes after self diagnosis of the first detection portion is completed, self diagnosis of the second detection portion is executed. An interval between self diagnosis of the first detection portion and that of the second detection portion is defined as a time interval that enables vibrations of the movable electrodes 1a, 1b for self diagnosis of the first detection portion to stop. However, an interval may alternatively be selected as, for example, a time at which some vibrations of the electrodes 1a, 1b of the first detection portion still remain.

In the self diagnosis of the second detection portion, a voltage difference is generated between the fixed electrodes 2a, 2c and the fixed electrodes 2b, 2d based on the signals P1X, P2X, P1Y and P2Y. Regarding the second detection portion, the switch 32a of the switch circuit 32 is closed and the switch 32b thereof is opened based on the signal S2Y. Therefore, a voltage V2 (i.e., 4V in the present embodiment), which is different from the intermediate voltage V1 corresponding to an electrical potential between the fixed electrodes 2c, 2d, is applied to the non-inverting input terminal of the operational amplifier 31a to execute the self diagnosis.

Accordingly, a voltage difference between the movable electrode 1d and the fixed electrode 2d (=4V) is larger than that between the movable electrode 1c and the fixed electrode 2c (=1V), and therefore an electrostatic force between the movable electrode 1d and the fixed electrode 2d increases. As a result, the movable electrodes 1c, 1d are forced to move from a center position between the fixed electrodes 2c, 2d.

In the self diagnosis, a timing of the electrostatic force is controlled based on a period of the signal S2Y for driving the switch circuit 32 to make the movable electrodes 1c, 1d move sufficiently so that their movement can be detected.

The switch 32 is continuously changed based on the signal S2Y, and the intermediate voltage V1 corresponding to a voltage between voltage potentials of the both fixed electrodes 2c, 2d is applied to the non-inverting input terminal of the operational amplifier 31a as in the acceleration detection.

The second detection portion is then operated as the normal acceleration detection portion mentioned above, and therefore an output Gout Y corresponding to the movements of the movable electrodes 1c, 1d is obtained. In this manner, since the movements of the movable electrodes 1c, 1d caused by the electrostatic force are defined based on the voltage value applied to the non-inverting input terminal of the operational amplifier 31a, an output corresponding to the movement of the movable electrodes 1c, 1d is also defined. Therefore, the self diagnosis is executed by comparing an obtained output Gout Y to a predetermined output (self diagnosis value) defined based on the voltage value applied to the non-inverting input terminal of the operational amplifier 31a.

On the other hand, regarding the first detection portion, during the self diagnosis of the second detection portion, the switch 22a of the switch circuit 22 is opened and the switch 22b thereof is closed based on the signal S2X. Therefore, the intermediate voltage V1 is applied to the non-inverting input terminal of the operational amplifier 21a as in the acceleration detection. Accordingly, the self diagnosis is not executed.

As mentioned above, in the present acceleration sensor of the first embodiment, a voltage application timing for executing the self diagnosis of the first detection portion and that for executing the self diagnosis of the second detection portion are shifted so as not to correspond with each other. Accordingly, resonance of the sensor elements of the first detection portion does not affect that of the sensor elements of the second detection portion, and therefore sensor output error decreases. As a result, it is possible to diagnosis sensor malfunction accurately along each axis of a multi-axis acceleration sensor.

(Second Embodiment)

In the second embodiment, an acceleration sensor executes self diagnosis in a different manner than that of the first embodiment. Since sensor construction and basic operation are the same as in the acceleration sensor of the first embodiment, only those portions that are different are now described.

In the acceleration sensor of the second embodiment, a voltage frequency (hereinafter referred to as first voltage frequency) for executing the self diagnosis of a first detection portion and a voltage frequency (hereinafter referred to as second voltage frequency) for executing the self diagnosis of a second detection portion are differentiated from each other.

Figure 7:
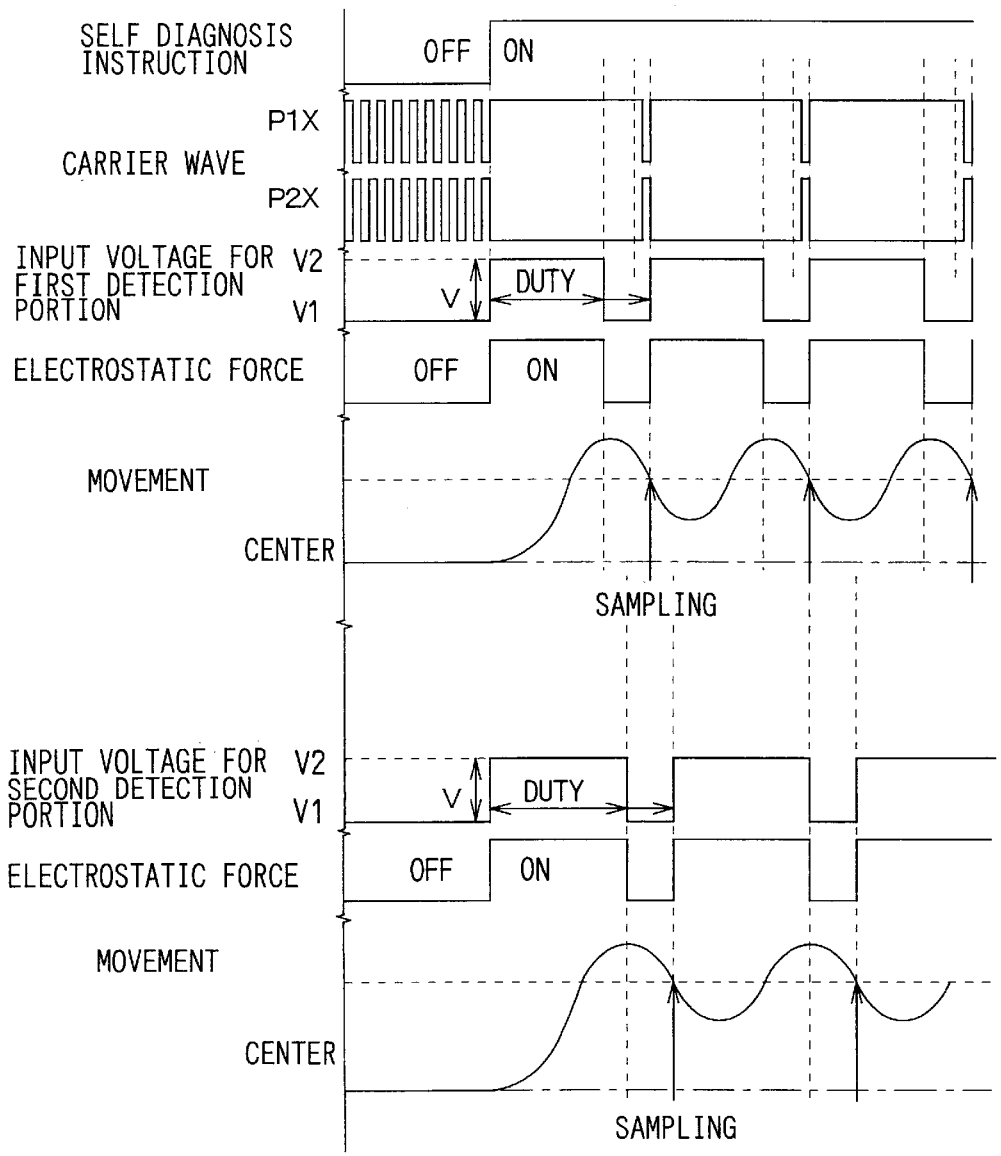
FIG. 7 shows a timing chart when the acceleration sensor is operative according to a second embodiment of the present invention.

FIG. 7 shows a timing chart when the acceleration sensor of the second embodiment is operative. In normal acceleration detection, because the self diagnosis instruction signal is low, first embodiment. In self diagnosis, the self diagnosis instruction signal is high and the acceleration sensor operates as follows.

At first, a voltage difference is generated between fixed electrodes 2a, 2c and fixed electrodes 2b, 2 d based on the signals P1X, P2X, P1Y and P2Y. Regarding the first detection portion, the switch 22a of the switch circuit 22 is closed and the switch 22b thereof is opened based on the signal S2X. Also, regarding the second detection portion, the switch 32a of the switch circuit 32 is closed and the switch 32b thereof is opened based on the signal S2Y. Therefore, a voltage V2 (i.e., 4V in the present embodiment), which is different from the intermediate voltage V1 corresponding to electrical potentials of the fixed electrodes 2a and 2b or the fixed electrodes 2c and 2d, is applied to the non-inverting input terminals of the operational amplifier 21a, 31a to execute the self diagnosis.

In this condition, as shown in FIG. 7, the first and second voltage frequencies are differentiated from each other. In addition, the first and second voltage frequencies are selected so that outputs Gout X, Gout Y are large. For example, the first is 7 kHz, and the second is 10 kHz.

When the voltages for executing the self diagnoses are applied to the first and second detection portions, voltage differences between the movable electrodes 1b, 1d and the fixed electrodes 2b, 2d (=4V) are larger than those between the movable electrodes 1a, 1c and the fixed electrodes 2a, 2c (=1V), and 1d and the fixed electrodes 2b, 2d increase. As a result, the movable electrodes 1a–1d are forced to move from respective center positions between the fixed electrodes 2a–2d.

The first and second detection portions are then operated in the normal acceleration detection mode mentioned in the first embodiment, and therefore outputs Gout X, Gout Y corresponding to the movements of the movable electrodes 1a–1d are obtained. Then, the self diagnoses of the first and second detection portions are executed by comparing obtained outputs Gout X, Gout Y to predetermined outputs (self diagnosis values) defined based on the voltage values applied to the non-inverting input terminal of the operational amplifiers 21a, 31a.

As mentioned above, in the acceleration sensor of the second embodiment, the first and second voltage frequencies are different from each other. Accordingly, peak positions of both voltages applied to the first and second detection portions are shifted, and wave interference of the voltages is restricted. As a result, it is possible to diagnose sensor malfunction accurately along each axis of the acceleration sensor.

In the acceleration sensor of the second embodiment, the first and second voltage frequencies may be changed to any frequencies. However, it is preferable to select a relationship that one of these voltage frequencies is not twice than the other frequency. This is because secondary resonance may cause output error.

If wave interference of the voltages cannot be ignore within third resonance, and a frequency that corresponds to a lowest common multiple of the first and second voltage frequencies is the lowest common multiple frequency (for example, the lowest common multiple frequency equals 12 kHz if the first voltage frequency is 3 kHz and the second voltage frequency is 4 kHz), n and m satisfying following formula preferably have a value of four or more.

(First voltage frequency)×n=(second voltage frequency)×m=lowest common multiple frequency (Modification)

In the first and second embodiments, an acceleration sensor is used as a capacitive type physical quantity detecting sensor. However, another sensor such as a pressure sensor or a yaw rate sensor maybe alternatively adapted as the capacitive type physical quantity detecting sensor.

In the first and second embodiments, the present invention is applied to acceleration sensors for detecting acceleration along two axes. However, the present invention can be applied to an acceleration sensor for detecting acceleration along three axes (X, Y, Z axes). In this case, the present invention is applied to at least two of these axes.

The first detection portion for detecting acceleration along the X axis and the second detection portion for detecting acceleration along the Y axis can be formed on the same substrate.

The present invention may be alternatively adapted to a capacitive type physical quantity detecting sensor having different spring constants on X and Y axes. Also, the present invention may be alternatively adapted to a capacitive type physical quantity detecting sensor for detecting physical quantity in the same direction (X—X axes). In this case, respective detection portions can be selected to have different detection ranges.

While the above description is of the preferred embodiments of the present invention, it should be appreciated that the invention may be modified, altered, or varied without deviating from the scope and fair meaning of the following claims.

What is claimed is:

1. A capacitive type physical quantity detecting sensor comprising:
    a plurality of physical quantity detection portions for detecting a physical quantity, the plurality of physical quantity detection portions respectively including:
        a movable electrode that moves based on a physical quantity change;
        a fixed electrode disposed to face the movable electrode;
        a control signal generator for generating control signals;
        a C-V converter for outputting a voltage that corresponds to a change of a capacitance formed between the movable electrode and the fixed electrode; and
        a signal processing circuit for processing the output voltage from the C-V converter and for outputting a signal corresponding to the physical quantity change;
    wherein the control signal generator transmits a first signal to the movable electrode and the fixed electrode to detect the change in the capacitance formed between the movable electrode and the fixed electrode during a normal physical quantity detection timing interval, and transmits a second signal to the movable electrode and the fixed electrode to move the movable electrode for diagnosing a malfunction of each of the physical quantity detection portions in a self diagnosis timing interval,
    the control signal generator transmits the second signal to the movable electrode and the fixed electrode of each physical quantity detection portion at different timing intervals.

2. The capacitive type physical quantity detecting sensor according to claim 1, wherein the control signal generator transmits the second signal to the movable electrode and the fixed electrode of a first one of the plurality of physical quantity detection portions, and transmits the second signal to the movable electrode and the fixed electrode of a second one of the physical quantity detection portions after the movable electrode of the first one of the plurality of physical quantity detection portions at least substantially stops.

3. The capacitive type physical quantity detecting sensor according to claim 1, wherein:
    in the normal physical quantity detection timing, the movable electrode of each of the physical quantity detection portions is applied for a first voltage via the C-V converter as the first signal, and
    during the self diagnosis timing interval, a second voltage different from the first voltage is applied to the movable electrode of each of the plurality of physical quantity detection portions via the C-V converter as the second signal,
    wherein the control signal generator applies the second voltage to the movable electrode of each of the plurality of physical quantity detection portions at different timing intervals.

4. A capacitive type physical quantity detecting sensor comprising:
    a plurality of physical quantity detection portions for detecting a physical quantity, each of the plurality of physical quantity detection portions respectively including:
        a movable electrode that moves based on a physical quantity change;
        a fixed electrode disposed to face the movable electrode;
        a control signal generator for generating control signals;
        a C-V converter for outputting a voltage that corresponds to a change in a capacitance formed between the movable electrode and the fixed electrode; and
        a signal processing circuit for processing the output voltage from the C-V converter and for outputting a signal corresponding to the physical quantity change;
    wherein the control signal generator transmits a first signal to the movable electrode and the fixed electrode to detect the change in the capacitance formed between the movable electrode and the fixed electrode during a normal physical quantity detection timing interval, and transmits a second signal to the movable electrode and the fixed electrode to move the movable electrode for diagnosing a malfunction of each of the plurality of physical quantity detection portions during a self diagnosis timing interval,
    wherein a first frequency of the second signal transmitted to a first one of the plurality of quantity detection portions is different from a second frequency of the second signal transmitted to a second one of the plurality of the physical quantity detection portions.

5. The capacitive type physical quantity detecting sensor according to claim 4, wherein the first frequency of the second signal is different from twice the second frequency of the second signal.

6. The capacitive type physical quantity detecting sensor according to claim 4, wherein a lowest common multiple frequency of the first frequency of the second signal and the second frequency of the second signal is at least four times the first frequency of the second signal and the second frequency of the second signal.

7. The capacitive type physical quantity detecting sensor according to claim 4, wherein:

during the normal physical quantity detection timing interval, a first voltage is applied to the movable electrode of each of the plurality of physical quantity detection portions via the C-V converter as the first signal, and during the self diagnosis timing interval, a second voltage different from the first voltage is applied to the movable electrode of each of the plurality of physical quantity detection portions via the C-V converter as the second signal, wherein the control signal generator applies the second voltage at a different frequency than that of the first voltage to the movable electrode of each physical quantity detection portion.

* * * * *